Patented Dec. 7, 1926.

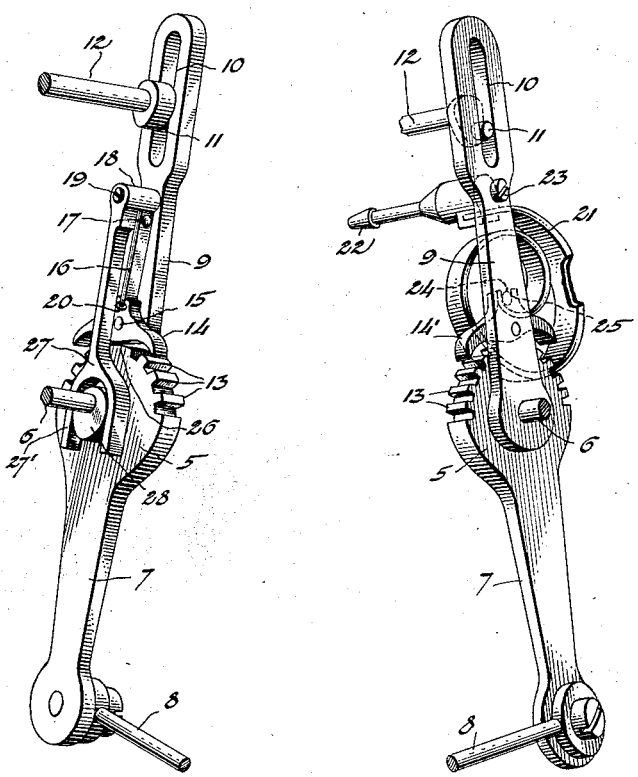

1,609,716

UNITED STATES PATENT OFFICE.

FENN M. HOLDEN, OF DETROIT, MICHIGAN.

DEVICE FOR TEMPERATURE CONTROL.

Application filed July 27, 1921. Serial No. 488,040.

The invention relates to control mechanism and is especially concerned with the provision of means whereby the actuation of control devices such as valves, shutters or other mechanism may be placed under the influence of a device or instrument responsive to changes in physical conditions. It is often desirable to cause certain adjustments to take place in response to changes in conditions such as, for example, the temperature or pressure of a fluid medium. A device, however, which is sufficiently sensitive to be readily responsive to such variations in physical conditions is generally incapable of exerting sufficient power to produce the desired adjustments in response to slight variations in the said physical conditions. The principal object of my invention therefore is to provide means whereby the desired amount of power may be exerted to produce movement of the controlled mechanism, the transmission of which power is determined by the position of an element or instrument responsive to changes in physical conditions.

A further object is to provide means for the adjustment of controlled mechanism which may be operated to a predetermined extent by connecting means under the direct influence of a device responsive to changes in physical conditions.

Further objects and advantages will appear from the following description taken in connection with the accompanying drawings, in which—

Fig. 1 is a perspective view of one embodiment of my invention; and

Fig. 2 is a similar view taken from the opposite side and showing another form of controlling instrument.

Referring to the drawings, 5 indicates a device to be actuated, shown as a disk or sector mounted upon a shaft 6, which latter may be supported in suitable bearings, not shown.

In order to transmit motion from the member 5 to any desired mechanism, the position of which is to be adjusted at intervals, the member 5 may be connected to or formed with an extension arm 7 to the end of which a link 8 may be connected in order to transmit motion to the part to be adjusted.

Pivotally mounted upon the shaft 6 is a lever 9 adapted to be reciprocated by any suitable mechanism capable of imparting to the lever the power necessary to actuate the devices to be adjusted. As shown, the lever is provided with a slot 10 in which engages a pin 11 eccentrically mounted on a shaft 12, which latter may be rotated constantly or intermittently by any suitable form of motor mechanism.

In order to transmit power from the lever 9 to the member 5, the latter may be provided upon its periphery with rack teeth 13, and a pawl 14 is pivotally mounted at 15 on the lever 9 in a position to engage the rack teeth when rotated slightly about its point of pivotal support. If it is desired to transmit motion to the member 5 in either direction, the pawl 14 may be formed, as shown, with two engaging points and the member 5 with two series of rack teeth upon opposite sides of the point of support of the pawl.

The movement of the pawl is produced by an instrument affected by the physical conditions to which the movement of the adjusted mechanism is to be rendered responsive. In Fig. 1, I have shown the instrument as a thermostat of conventional form, comprising a bi-metallic blade 16 one end of which may be secured, as at 17, to a member 18 pivotally mounted, as by the screw 19, upon the lever 9. The other end of the thermostat extends into a slot 20 formed upon the head of the pawl 14 whereby changes in the position of the thermostat in response to temperature changes in the environing medium will produce a rocking movement of the pawl 14 about its point of support 15.

In Fig. 2, I have shown a Bourdon tube 21 the interior of which communicates with a pipe 22 mounted rigidly upon the lever 9 as by screw 23. The free end of the Bourdon tube is connected to the pawl 14' as by means of a pin 24 secured to the end of the tube and seated in the slot 25 in the head of the pawl. Changes in the position of the Bourdon tube will cause a rocking movement of the pawl about its point of pivotal support as in the form shown in Fig. 1. The pipe 22 may be connected to any container containing fluid to changes in the condition of which the adjusted mechanism is to be rendered responsive. Should the amount of fluid in the system be constant, it will be obvious that the Bourdon tube may be rendered responsive to changes in temperature affecting the expansion of the fluid, or the tube may be responsive to changes in pressure produced in any other manner.

Between the two sets of rack teeth upon the member 5 may be provided a smooth portion 26 upon which the pawl 14 may rest when it has reached the end of either series of rack teeth and may thereby be rendered incapable of producing further movement of the rock arm 7 and the mechanism connected thereto.

If it is desired to cause only a slight motion of the adjusted part in response to a slight change in temperature, other means may be provided to limit the extent of movement to which the member 5 may be subjected, one form of which is illustrated in Fig. 1. The means shown comprises an arm 27 which may constitute an extension of or may be rigidly secured to the member 18 carrying the thermostat blade 16. The extremity of the arm is bifurcated to provide a yoke 27' engaging the opposite sides of a plate 28 rigid with the disk or sector 5 and eccentrically mounted with reference to the shaft 6. It will be seen that when the pawl is out of engagement with the rack teeth the member 18 will be held in fixed relation to the lever 9 by engagement of the yoke 27' around eccentric plate 28. Hence the end of the thermostatic blade secured at 17 will remain fixed relatively to the lever 9 and any deflection thereof will operate through movement of the free end to rock the pawl 14, thereby bringing the pawl into position to engage the rack teeth and rotate the member 5. Such rotation, however, will at once displace the thermostat support 18 by the action of eccentric 28 upon yoke 27', thereby returning the pawl to neutral position until further deflection of the thermostat in one direction or the other again rocks the pawl into engaging position. Thus it will be seen that the adjustment of the mechanism controlled by the member 5 may be limited to any desired extent under the influence of the thermostat or other instrument controlling the action of the pawl.

Should it be desired to omit the limiting mechanism just described and utilize the device for producing adjustment to two extreme positions only, the thermostat may, of course, be mounted directly upon the lever 9 or some element rigid therewith.

It will be understood that the invention may be employed wherever it is desirable to produce a movement or adjustment of parts under the control of an instrument responsive to changes in physical conditions where the instrument itself is not adapted to exert the power necessary to produce the said movement or adjustment.

Among the uses to which the mechanism is applicable may be mentioned the adjustment of devices such as fuel valves, dampers, or the like, for controlling the production, distribution, or utilization of heat, the control of fluid pressure, etc. In connection with a motor vehicle, the invention might be applied to control of the jacket temperature of the engine by adjustment of radiator shutters, hood louvers, valves, fan operation, etc., to control of intake manifold heating in response to temperature of intake gases, to carbureter adjustment, to actuation of ventilating or heating devices for a passenger compartment, to maintenance of constant temperature in the oiling system, etc. Many other uses will occur to one skilled in the art and the above are suggested as illustrative of the general applicability of the invention.

Various changes may of course be made in details of construction and operation without departing from the spirit and scope of the invention and therefore I do not wish to be limited to the specific structure herein described except as required by the language of the appended claims in view of the prior art.

I claim:—

1. Actuating mechanism comprising a device to be actuated, an actuator therefor, means adapted to connect said actuator to said device to transmit motion from one to the other, means responsive to physical changes in a fluid medium arranged to position said connecting means in or out of its motion-transmitting position and additional means for disconnecting said connecting means after a predetermined movement of said device.

2. Control mechanism comprising an oscillatory actuator, a device to be actuated, connecting means adapted to communicate motion from said actuator to said device, and means carried by said actuator adapted to respond to temperature changes and operative upon said connecting means to effect connection or interruption of connection between said actuator and said device.

3. Control mechanism comprising an oscillatory actuator, a device to be actuated provided with rack teeth; a pawl on said actuator engageable with said teeth, means adapted to respond to temperature changes and operative upon said pawl to move the same into engagement with said teeth, and means adapted to effect disengagement of said pawl from said teeth after predetermined movement of said device.

4. Control mechanism comprising an oscillatory actuator, a device to be actuated provided with rack teeth, a pawl on said actuator engageable with said teeth, and a thermostat mounted upon said actuator and operative to bring said pawl into engagement with said teeth.

5. Control mechanism comprising an oscillatory actuator, a device to be actuated provided with rack teeth, a pawl on said actuator engageable with said teeth, and a device mounted upon said actuator and operative to bring said pawl into engagement with said teeth, said device being responsive to changes in the expansive effect of a confined body of fluid.

6. Control mechanism comprising an actuator supported for reciprocating movement, a device to be actuated provided with rack teeth, a double pawl mounted upon said actuator in position to be engaged with said teeth to cause movement of said device in either direction, and means carried by said actuator and adapted to cause engagement of said pawl with said teeth, said means being subject to movement in response to physical conditions of a fluid medium to which it is exposed.

In testimony whereof I affix my siganture.

FENN M. HOLDEN.